UNITED STATES PATENT OFFICE.

WILLIAM D. RENNIE, OF HACKENSACK, NEW JERSEY, ASSIGNOR TO UNIVERSAL ORE REDUCTION COMPANY, OF PHOENIX, ARIZONA TERRITORY, A CORPORATION OF ARIZONA TERRITORY.

MIXTURE OR COMPOSITION FOR USE IN THE ART OF EXTRACTING THE PRECIOUS METALS, GOLD AND SILVER, FROM THEIR NATIVE ORES.

989,804.     Specification of Letters Patent.     Patented Apr. 18, 1911.

No Drawing.     Application filed April 19, 1910. Serial No. 556,363.

*To all whom it may concern:*

Be it known that I, WILLIAM D. RENNIE, a citizen of the United States, and resident of Hackensack, county of Bergen, and State of New Jersey, have made a new and useful invention in mixtures or compositions for use in the art of extracting the precious metals, gold and silver, from their native ores, of which the following is a specification.

This invention relates to improvements in mixtures or compositions adapted for use in electrolytic processes for the separation of gold and silver from their native ores, and to this end it consists of the novel mixture composed of a liquid, as water, a powder of the ore to be treated, fluor-spar, a bromin salt and cyanid of potassium when combined in the proportions and in the manner hereinafter set forth.

Referring now to the manner of procedure I combine 2000 pounds of water, 2000 pounds of gold or silver ore; 300 pounds of fluor-spar, 15 pounds of bromin salt and 5 pounds of cyanid of potassium. The water and powder of the ore are first mixed in an electrolytic cell and then the current from a source of electrical energy is applied to the poles of said cell at the proper potential, dependent upon the properties and condition of the ore to be treated. The liquid as thus acted upon by the current is agitated or caused to flow continuously between the anodes and cathodes and preferably in an upward direction, under the influence of air or steam under pressure and the elements held in solution are allowed to descend by gravity, and thus continuously moved between the poles of the cell. At the start 100 pounds of fluor-spar, 15 pounds of the bromin salt and 5 pounds of the cyanid of potassium are added to the solution and like amounts of these ingredients are added at the end of say two hours and four hours respectively, continuing the agitation and flow of the current, however, for an additional two hours, or a total of six hours. This constitutes the treatment of one batch and such treatment is found to effect the actual deposit of the gold or silver upon the anode of the cell. After one batch of the material has been treated thus the resultant liquid may be used over and over again indefinitely by adding after each treatment 45 pounds of fluor-spar; 1½ pounds bromin salt and ¾ of a pound of cyanid potassium per ton and in the order and manner already indicated; that is to say, these proportional amounts are added to the mixture on beginning each treatment and for two and four hours successively, and such treatment and additions may be continued indefinitely.

I make no claim hereinafter to the process pursued in using this novel electrolyte, as this process is in substance claimed in a companion application filed by me in the United States Patent Office of even date herewith, bearing Serial No. 556,361 and known as Case A.

By mixing the ore to be treated with the described proportions of fluor-spar, a bromin salt, cyanid of potassium and water, and causing the mixture to be passed between the electrodes, I make a deposit of the precious metals upon the cathode, all of the extraction and precipitation taking place at one time and in one operation at a heat of about 210°, or that of steam. The current passing through the mixture at that temperature makes the change of the calcium chlorid into ferric chlorid from the iron in the ore and also converts the bromin salt into ferric chlorid which, acting upon the metals in the ore, makes the extraction and deposition on the cathode and the cyanid of potassium combines with the others to help in such extraction.

I do not limit my invention to the especial proportions of materials enumerated; nor to the times of applying the same, as obviously these may be departed from, it being apparent that the variable conditions of the powdered ores may necessitate some varying, both in the proportions and in the manner of practicing the process.

Having thus described my invention what I claim and desire to secure by Letters Patent of the United States is—

1. A mixture or composition for use in electrolytically treating gold and silver ores, embracing water, powdered ore of the metal, fluor-spar, a bromin salt, and cyanid of potassium, substantially as described.

2. A mixture or composition for use in electrolytically treating gold and silver ores, embracing 2000 pounds of water, 2000 pounds of the powdered ore of the metal; 300 pounds of fluor-spar; 15 pounds of bromin salt and 5 pounds of cyanid of potassium, mixed in the order and times enumerated and while under the influence of an electrical current, substantially as described.

In testimony whereof I have signed my name to this specification in the presence of two subscribing witnesses.

WILLIAM D. RENNIE.

Witnesses:
BARTON B. WARD,
C. J. KINTNER.

---

Copies of this patent may be obtained for five cents each, by addressing the "Commissioner of Patents, Washington, D. C."